US007453226B2

United States Patent
Wang et al.

(10) Patent No.: US 7,453,226 B2
(45) Date of Patent: Nov. 18, 2008

(54) SYNCHRONIZED REAR VISION SYSTEM

(75) Inventors: Jenne-Tai Wang, Rochester, MI (US);
Dorel M. Sala, Troy, MI (US);
Kioumars Paryani, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 285 days.

(21) Appl. No.: 11/220,465

(22) Filed: Sep. 7, 2005

(65) Prior Publication Data
US 2006/0158757 A1 Jul. 20, 2006

Related U.S. Application Data

(60) Provisional application No. 60/645,225, filed on Jan. 20, 2005.

(51) Int. Cl.
*G05B 11/01* (2006.01)
(52) U.S. Cl. .................... 318/560; 318/700; 318/81; 318/101
(58) Field of Classification Search ............ 318/560, 318/51, 101, 700, 705, 721
See application file for complete search history.

(56) References Cited

U.S. PATENT DOCUMENTS

| 4,682,088 | A | * | 7/1987 | Sullivan .................. 318/568.1 |
|---|---|---|---|---|
| 4,929,878 | A | * | 5/1990 | Hansen ....................... 318/560 |
| 4,986,646 | A | * | 1/1991 | Hamamoto et al. ......... 359/873 |
| 5,142,209 | A | * | 8/1992 | Barrs ......................... 318/265 |
| 5,798,575 | A | * | 8/1998 | O'Farrell et al. ........... 307/10.1 |
| 6,472,773 | B2 | * | 10/2002 | Kramer et al. ............. 307/10.1 |
| 2003/0034752 | A1 | * | 2/2003 | Kramer et al. ............. 318/560 |

OTHER PUBLICATIONS

George Platzer, "A Simple Way to Prevent Blindzone Accidents", SAE Technical Paper 950601, 1996.

* cited by examiner

*Primary Examiner*—Rina I Duda (57) ABSTRACT

A synchronized rear vision system for a vehicle includes a pair of external side rearview mirrors for attachment to the vehicle and an interior rearview mirror for attachment to the vehicle. The synchronized rear vision system also includes a system master controller for detecting an instantaneous position of one of the side rearview mirrors and calculating position output signals for at least another one of the side rearview mirrors and the interior rearview mirror to automatically position at least the another one of the side rearview mirrors and the interior rearview mirror based on the instantaneous position. The synchronized rear vision system may include a controller to readjust the position of the rearview mirrors based on a position of a driver seat of the vehicle.

30 Claims, 7 Drawing Sheets

SYNCHRONIZED REAR VISION SYSTEM

CROSS-REFERENCE TO RELATED APPLICATION(S)

The present application claims the benefit of U.S. Provisional Patent Application Ser. No. 60/645,225, filed Jan. 20, 2005.

TECHNICAL FIELD

The present invention relates generally to vehicles and, more particularly, to a synchronized rear vision system for a vehicle.

BACKGROUND OF THE INVENTION

It is known to provide a rear vision system for a vehicle such as a motor vehicle. Typically, the rear vision system includes a pair of outside or exterior side rearview mirrors, one on both driver and passenger sides of the vehicle, and an inside or interior rearview mirror in an occupant compartment of the vehicle.

Such a rear vision system may be power operated to allow a driver to remotely and individually adjust the side and interior rearview mirrors without physically attending them. These mirrors are typically adjustable both vertically (up/down) and horizontally (left/right), using electric motors controlled by the driver via a mirror position switch.

Usually, a single mirror position switch assembly is used, which includes a joystick type switch for directing the two-directional movement of the motors as well as a left/right selector switch that switches between the two exterior side rearview mirrors so that they can be adjusted one at a time, independently of each other. The selector switch may also include a locked position so that movement of the joystick does not activate either of the mirror motors.

On vehicles provided with memory positioning, the mirrors can be automatically moved by suitable vehicle circuitry to a preset position established by the driver. Such circuitry can be implemented using position sensors on the mirrors to determine the instantaneous position of the mirrors in both the horizontal and vertical directions. These types of mirror positioning circuits are well known.

Figure 1A:
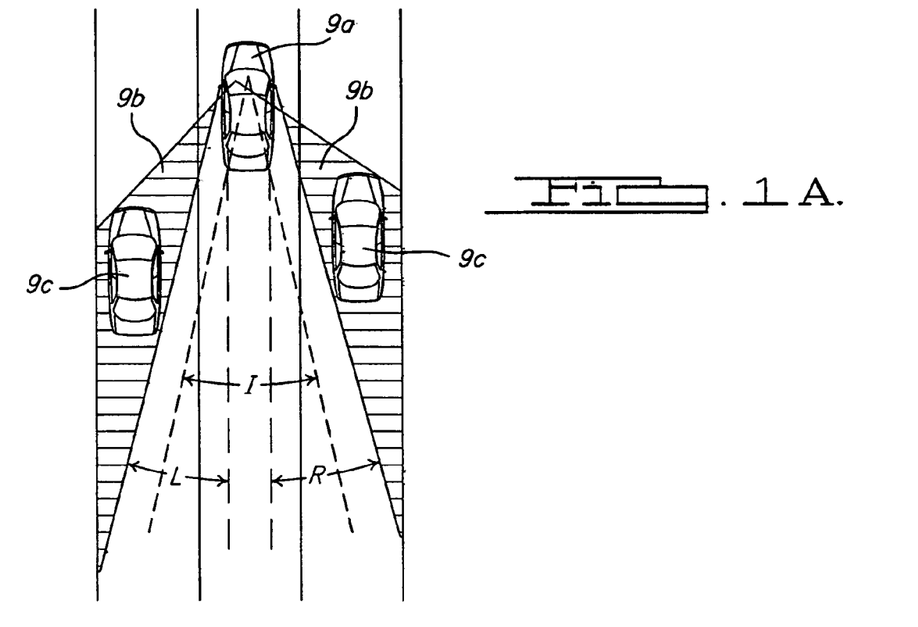
FIG. 1A is a diagrammatic view of a rear vision system for a vehicle illustrated for a Blindzone setting method.

It is also known to automatically adjust a rear vision system for a vehicle. One example of such a system is disclosed in U.S. Pat. No. 6,840,637 to Wang. In this patent, adjustments by a vehicle operator to a driver side mirror are used to make automatic adjustments to a passenger side mirror without requiring the operator to make separate independent adjustment of the mirror. The automatic adjustment is determined using a measured horizontal angle of the driver side mirror along with distance data related to a position of an inboard edge of each of the exterior side mirrors based on a popular setting method, namely a Blindzone setting method (FIG. 1A). In the Blindzone setting method of FIG. 1A, a vehicle 9 has a left-hand side rearview mirror (L) and a right-hand side rearview mirror (R). The vehicle 9 also has an interior rearview mirror (I). If not obstructed, the interior rearview mirror overlaps coverage of the outside side rearview mirrors when the mirror is centered on a road. The field of view of the outside side rearview mirror is about half that of the interior rearview mirror. As such, shaded regions 9b in FIG. 1A are blindzones in which other vehicles 9c may be located and cannot be seen in either the interior rearview mirror or the driver's peripheral vision. As a result, it is still necessary to turn and look into the blindzones when changing lanes.

While the Blindzone method might be a more popular setting method, it is not a recommended method by experts unless the interior rearview mirror is obstructed, in which case, the method offers better coverage of the back of the vehicle. Instead, another method, namely a Blindzone/Glare Elimination (BGE) setting method (FIG. 1B), is recommended by experts to set the rearview mirrors of the rear vision system.

Figure 1B:
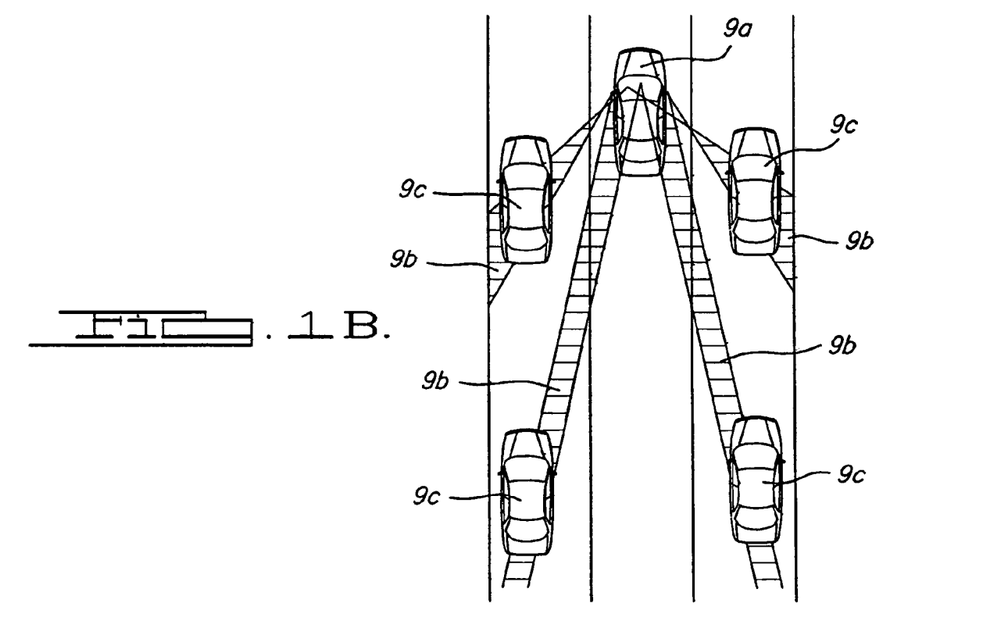
FIG. 1B is a diagrammatic view of a rear vision system for a vehicle illustrated for a Blindzone/Glare Elimination setting method.

In the Blindzone/Glare Elimination setting method of FIG. 1B, the field of view of each outside side rearview mirror is turned outward by about fifteen degrees (15) from the blindzone setting. There are now four (4) mini blindzones 9b, but none is large enough to hide other vehicles 9c. With this setting method, it is no longer necessary to turn and look into the blindzones when changing lanes. All that is required is a glance at the outside side mirror to see if other vehicles 9b are there.

Therefore, it is desirable to provide a rear visions system having an automatic setting method that allows use of the Blindzone/Glare Elimination (BGE) setting method to adjust a rear vision system. It is also desirable to provide a rear vision system that synchronizes adjustment of the rearview mirrors. It is also desirable to provide a rear vision system having an automatic setting method detection and selection that allows use of either the Blindzone setting method or the Blindzone/Glare Elimination (BGE) setting method to adjust a rear vision system in a manner transparent to the driver. It is further desirable to provide a rear vision system having an automatic setting method that includes a position of a seat in adjustment of the rearview mirrors. Therefore, there is a need in the art to provide a rear vision system that meets these desires.

SUMMARY OF THE INVENTION

It is, therefore, one object of the present invention to provide a synchronized rear vision system that allows a driver to use Blindzone/Glare Elimination setting method for a vehicle.

It is another object of the present invention to provide a synchronized rear vision system with an automatic setting method detection and selection that allows a driver to use either the Blindzone setting method or the Blindzone/Glare Elimination setting method to adjust a rear vision system.

It is yet another object of the present invention to provide a synchronized driver seating adjustment and rear vision system with an automatic setting method detection and selection.

To achieve the foregoing objects, the present invention is a synchronized rear vision system for a vehicle including a pair of external side rearview mirrors for attachment to the vehicle and an interior rearview mirror for attachment to the vehicle. The synchronized rear vision system also includes a system master controller for detecting an instantaneous position of one of the side rearview mirrors and calculating position output signals for at least another one of the side rearview mirrors and the interior rearview mirror to automatically position at least the another one of the side rearview mirrors and the interior rearview mirror based on the instantaneous position.

One advantage of the present invention is that a synchronized rear vision system is provided for a vehicle that has an automatic setting detection and selection. Another advantage of the present invention is that the synchronized rear vision system enables a driver to use either the Blindzone setting method or the Blindzone/Glare Elimination (BGE) setting method to adjust the rear vision system. Yet another advantage of the present invention is that the synchronized rear vision system eliminates cumbersome right-hand side rearview mirror adjustment effort required by the BGE setting method. Still another advantage of the present invention is that the synchronized rear vision system reduces up to 70% of the worked for the driver in setting the rear vision system. A further advantage of the present invention is that the synchronized rear vision system eliminates re-adjustment effort when adjusting a driver seat of the vehicle. Yet a further advantage of the present invention is that the synchronized rear vision system allows personalized driver seat and rear vision system setting, providing a comfortable seating position for the driver, especially in the case of driving long distances. Still a further advantage of the present invention is that the synchronized rear vision system can enable a vehicle with lateral adjustment of the driver seat and/or with open cockpit (e.g. a drive-by-wire vehicle), providing comfortable and flexible seating position for the driver, thereby providing a better view of the front for the rear seat occupants.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 6 is a diagrammatic view of a synchronized rear vision system, according to the present invention.

DESCRIPTION OF THE PREFERRED EMBODIMENT

Figures 2A, 2B:
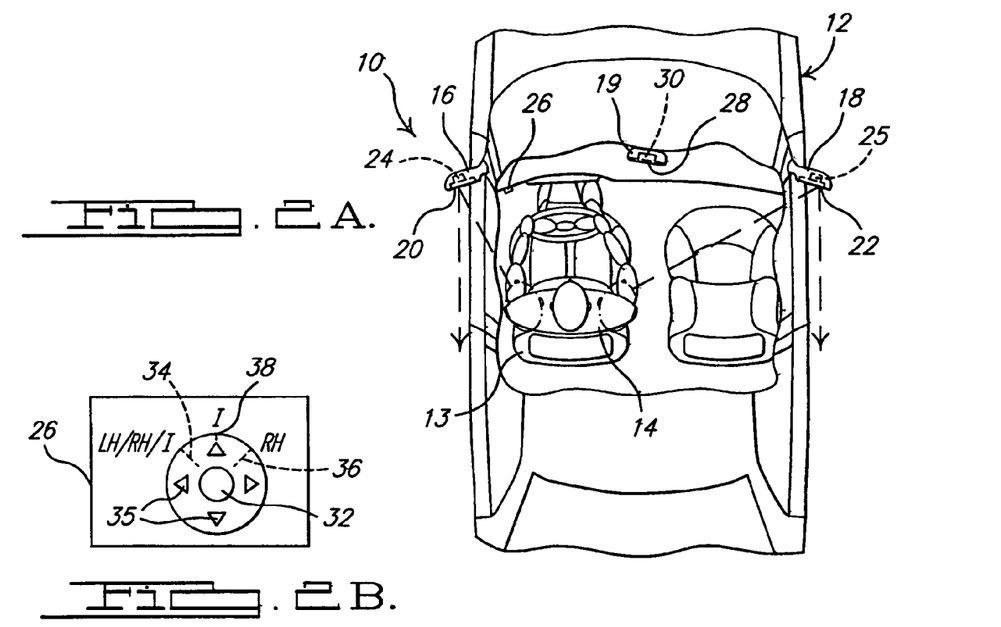
FIG. 2A is a plan view of a synchronized rear vision system, according to the present invention, illustrated in operational relationship with a vehicle.
FIG. 2B is an elevational view of a mirror switch assembly of the synchronized rear vision system of FIG. 2A.

Referring to the drawings and in particular FIGS. 2A and 2B, one embodiment of a synchronized rear vision system 10, according to the present invention, is shown for a vehicle, generally indicated at 12. The vehicle 12 includes an adjustable driver seat 13 located in an occupant compartment of the vehicle 12. To assist an occupant driver 14 seated in the adjustable driver seat 13 in obtaining a view to a rear of the vehicle 12, the synchronized rear vision system 10 includes a left-hand, LH, side rearview mirror assembly 16, a right-hand, RH, side rearview mirror assembly 18, and an interior rearview mirror assembly 19. The side rearview mirror assemblies 16 and 18 are each disposed on a respective exterior side of the vehicle 12 and the interior rearview mirror assembly 19 is disposed in an interior or the occupant compartment of the vehicle 12.

Each side rearview mirror assembly 16 and 18 has a reflective element such as a mirror 20 and 22, respectively, having an angular position that is adjustable by a pair of positioning motors 24 and 25, respectively, for each assembly 16 and 18—one for horizontal positioning and the other for vertical positioning. The rear vision system 10 also includes a mirror selection or position switch assembly 26 to allow the occupant driver 14 to operate the motors 24 and 25 for each side rearview mirror assembly 16 and 18, respectively, from within the vehicle 12.

The interior rearview mirror assembly 19 has a reflective element such as a mirror 28 having an angular position that is adjustable by a pair of positioning motors 30—one for horizontal positioning and the other for vertical positioning. The mirror position switch assembly 26 allows the occupant driver 14 to operate the motors 30 for the interior rearview mirror assembly 19 from within the vehicle 12.

As illustrated in FIG. 2B, the mirror position switch assembly 26 has a short joystick-type actuation or adjustment input arm or lever 32 that is both displaceable through a small arc in four directions (up, down, left, and right) and rotatable about its central axis between three positions (identified as left-hand/right-hand/interior (LH/RH/I), interior (I), and right-hand (RH)). When the lever 32 is rotated to the LH/RH/I mode position 34, pivotal movement of the lever 32 to any of its four positions will cause a concomitant change in the position of the LH mirror 20, and the synchronized rear vision system 10 will automatically adjust the RH mirror 22 and interior mirror 28 as well. The four directional positions can be identified by arrows 35 imprinted on the switch 26. Rotation of the lever 32 to a RH mode position 36 will enable the occupant driver 14 to adjust the RH mirror 22 directly, without affecting the LH mirror 20 or the interior mirror 28. In addition, the lever 32 can be rotated to an interior mode position 38, which will enable the occupant driver 14 to adjust the interior mirror 28 directly, without affecting the LH mirror 20 or the RH mirror 22. It should be appreciated that the mirror position switch assembly 26 may have a neutral position that does not allow for adjustment of any of the mirrors. It should also be appreciated that a variety of switch configurations can be used for the synchronized rear vision system 10 such as where, for example, the mirror selection switch function is separated from the lever 32 and implemented using a rocker switch, slide switch, or other independent switch, and a simpler joystick type switch can be used for directional control.

Figure 3:
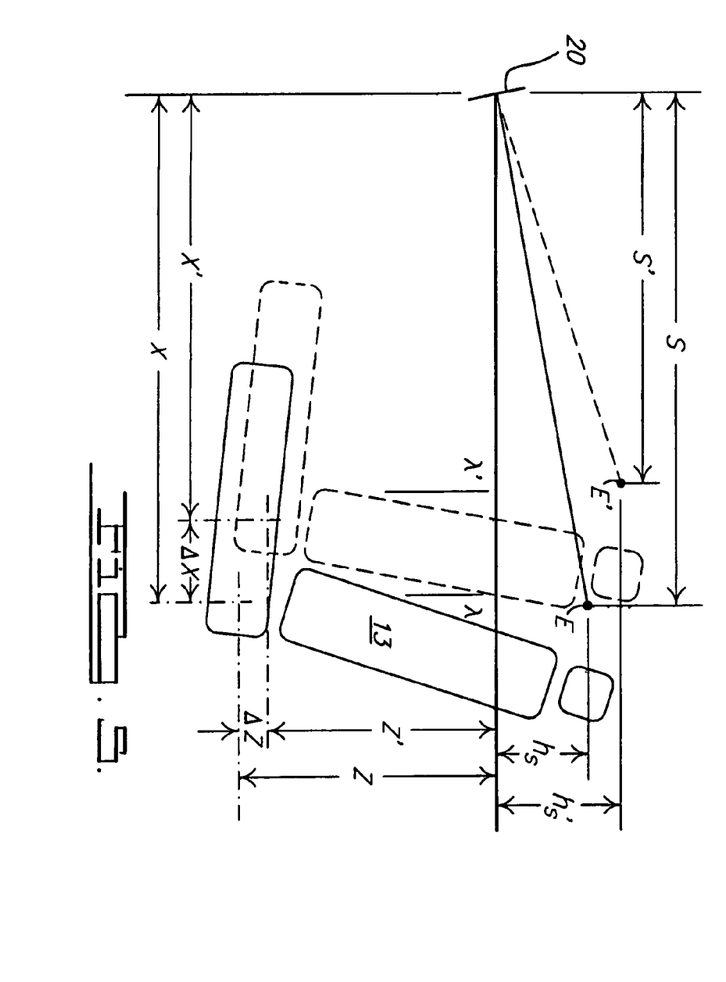
FIG. 3A is a diagrammatic view of a geometrical relationship of a Blindzone setting method for left and right positions of the synchronized rear vision system of FIGS. 2A and 2B.
FIG. 3B is a diagrammatic view of a geometrical relationship of a Blindzone setting method for up and down positions of the synchronized rear vision system of FIGS. 2A and 2B.
Figure 3A:
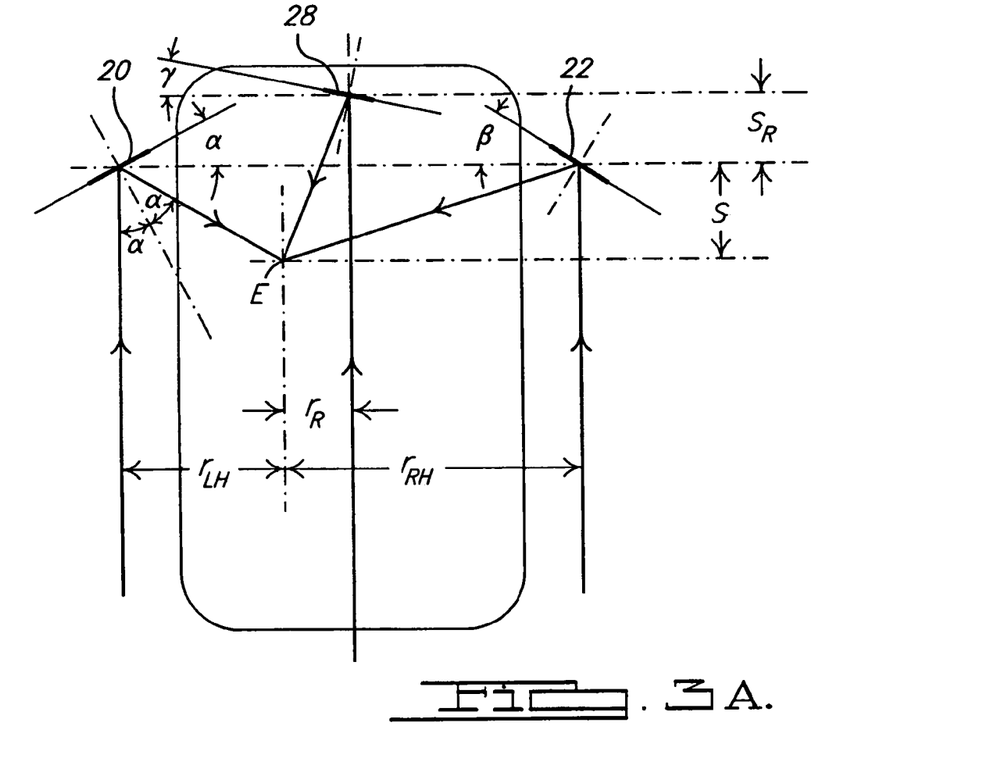
Figure 3B:
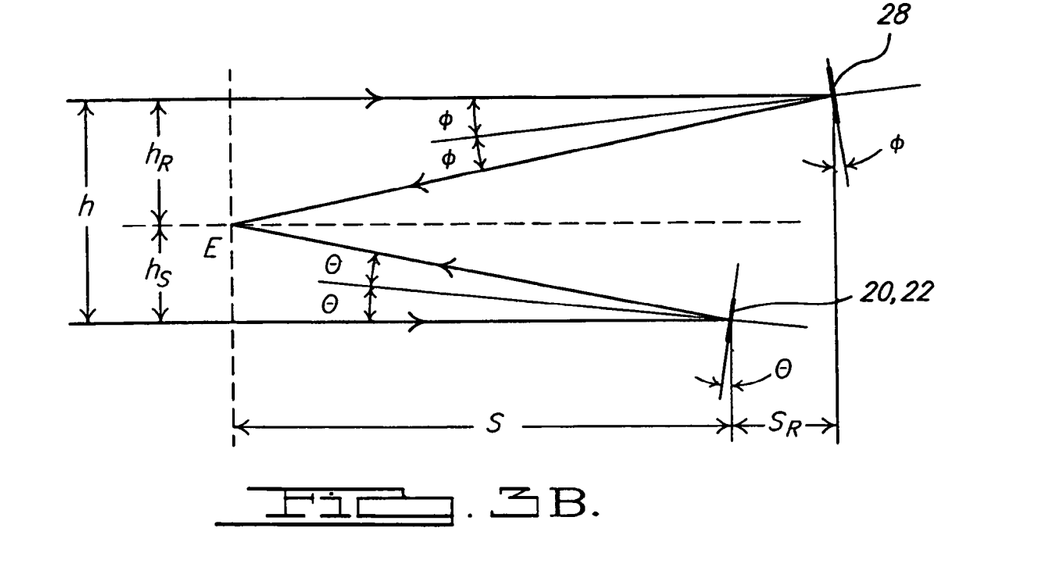

Referring to FIGS. 3A and 3B, a geometrical relationship is shown for a driver's eye (E), the left-hand side mirror 20, the right-hand side mirror 22 and the interior mirror 28 when using the Blindzone setting method. As illustrated in FIG. 3A, the left-right positions for the synchronized rear vision system 10 are shown. The driver's eye (E) position in normal driving posture, the left-hand side mirror 20, right-hand side mirror 22, and interior mirror 28 are shown. When applying geometric relationships and making certain approximations, a rear vision system master controller 40 (FIG. 6) can use an equation to calculate the desired RH mirror 22 horizontal angle ($\beta$) and desired interior mirror 28 horizontal angle ($\gamma$) using only the measured LH mirror 20 horizontal angle ($\alpha$) and distance data concerning the position of each of these mirrors 20,22,28. The LH mirror 20 horizontal angle ($\alpha$) is determined using received feedback position data from position sensors 42 (FIG. 6). As will be understood from the discussion below, distance data can be completely determined using only the measured LH mirror 20 horizontal angle ($\alpha$) along with predetermined data that is fixed for a particular vehicle model and can be preloaded by the manufacturer into the controller 40. In calculating the LH mirror 20 horizontal angle ($\alpha$), the relationship between the feedback position data and the associated horizontal angle can be provided in any desired form such as by an equation or as a look-up table. In this regard, determination of the horizontal angle need not involve any such conversion of the position data to a value measured in angular degrees, but rather the horizontal angle can be represented using any analog or digital value suitable for determining a side rearview mirror control signal that can be used along with the position sensors to move the side rearview mirror to the proper corresponding position. Thus, in some embodiments, the directly-measured data from the sensors can be converted to a corresponding control signal for the side rearview mirror without transforming the measured data into an angular quantity.

Using one equation, the longitudinal distance (S) from the driver's eye (E) to a centerpoint of the mirrors 20 and 22 is calculated as follows:

$$S = r_{LH} / \tan 2\alpha$$

wherein $r_{LH}$ is a lateral distance from the driver's eye (E) to a centerpoint of the left-hand side mirror 20.

Using another equation, the desired RH mirror 22 horizontal angle ($\beta$) can be calculated using only the measured LH mirror 20 horizontal angle ($\alpha$) and distance data concerning the position of each of these mirrors 20,22. The RH mirror 22 horizontal angle ($\beta$) is calculated as follows:

$$\beta = \tfrac{1}{2} \tan^{-1} (r_{RH}/S) + \beta_b$$

wherein $r_{RH}$ is a lateral distance from the driver's eye (E) to a centerpoint of the right-hand side mirror 22, the longitudinal distance (S) is from the driver's eye (E) to a centerpoint of the right-hand side mirror 22, and $\beta_b$ is a personal bias horizontal angle of the right-hand side mirror 22.

Using another equation, the desired interior mirror 28 horizontal angle ($\gamma$) can be calculated using only the measured LH mirror 20 horizontal angle ($\alpha$) and distance data concerning the position of each of these mirrors 20,22. The interior mirror 28 horizontal angle ($\gamma$) is calculated as follows:

$$\gamma = \tfrac{1}{2} \tan^{-1} [r_R/(S+S_R)] + \gamma_b$$

wherein $r_R$ is a lateral distance from the driver's eye (E) to a centerpoint of the interior mirror 28, the longitudinal distance (S) is from the driver's eye (E) to a centerpoint of the right-hand side mirror 22, the longitudinal distance ($S_R$) is from the centerpoint of the right-hand side mirror 22 to a centerpoint of the interior mirror 28, and $\gamma_b$ is a personal bias horizontal angle of the rearview mirror 28. It should be appreciated that $r_L$ is a lateral distance from the driver's eye (E) to a focal point of the left-hand side mirror 20.

As illustrated in FIG. 3B, the up-down positions for the synchronized rear vision system 10 are shown. The driver's eye (E) position in normal driving posture, the left-hand side mirror 20, right-hand side mirror 22, and interior mirror 28 are shown. The vertical distance (h) is the distance from the centerpoint of the side mirrors 20,22 to the interior mirror 28.

Using one equation, the vertical distance ($h_R$) from the driver's eye (E) to a centerpoint of the interior mirror 28 is calculated as follows:

$$h_R = h - h_S$$

wherein a side vertical distance ($h_S$) is the distance from the driver's eye (E) to a centerpoint of the side mirrors 20,22.

Using another equation, the vertical distance ($h_S$) from the driver's eye (E) to a centerpoint of the side mirrors 20,22 is calculated as follows:

$$h_S = S \tan 2\theta$$

wherein S was calculated as previously described.

Using another equation, the desired interior mirror 28 vertical angle ($\phi$) can be calculated. The interior mirror 28 vertical angle ($\phi$) is calculated as follows:

$$\phi = \tfrac{1}{2} \tan^{-1} [h_R/(S+S_R)]$$

wherein S and $S_R$ were calculated as previously described.

Figure 4A:
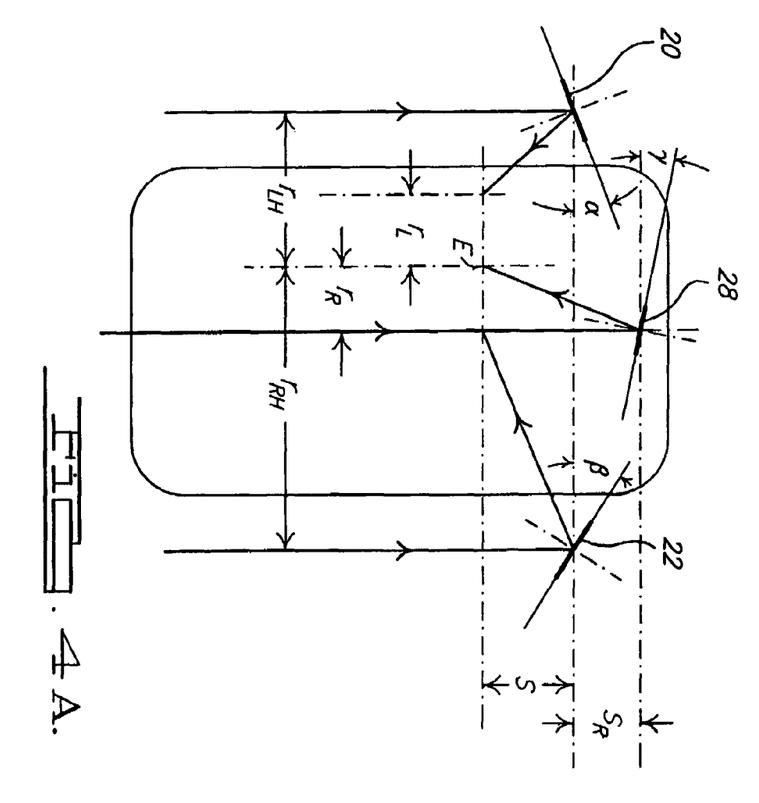
FIG. 4A is a diagrammatic view of a geometrical relationship of a Blindzone/Glare Elimination setting method for left and right positions of the synchronized rear vision system of FIGS. 2A and 2B.
Figure 4B:
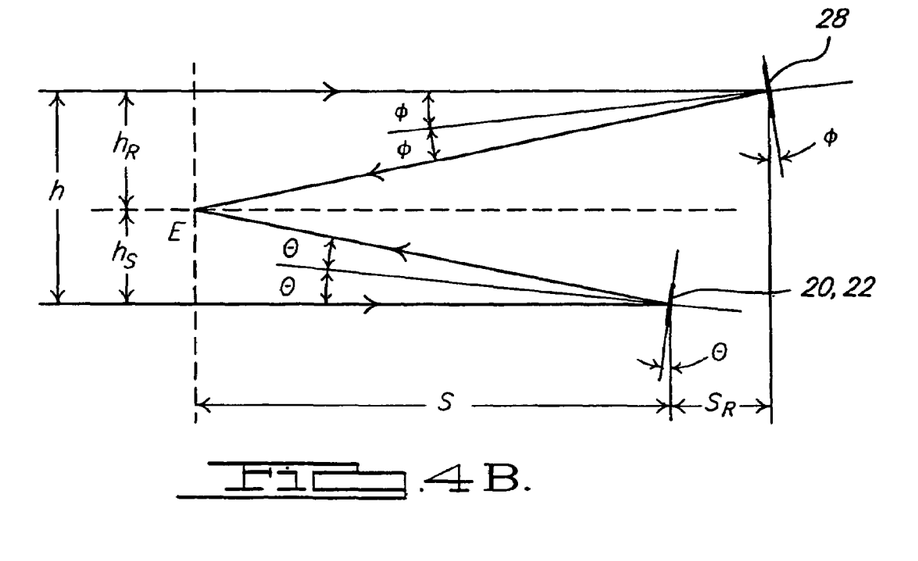
FIG. 4B is a diagrammatic view of a geometrical relationship of a Blindzone/Glare Elimination setting method for up and down positions of the synchronized rear vision system of FIGS. 2A and 2B.

Referring to FIGS. 4A and 4B, a geometrical relationship is shown for a driver's eye (E), the left-hand side mirror 20, the right-hand side mirror 22, and the interior mirror 28 when using the Blindzone/Glare Elimination (BGE) setting method. Recall that the BGE setting method requires turning the field of view of each outside side mirror 20 and 22 outward by about fifteen degrees (15°) from the Blindzone setting. For the driver's side mirror 20, this is done by placing the driver's head against the side window and then setting the mirror 20 to just see the side of the vehicle 12. Do the same with the passenger side mirror 22, but position the driver's head at the middle of the vehicle 12.

As illustrated in FIG. 4A, the left-right positions for the synchronized rear vision system 10 are shown. The driver's eye (E) position in normal driving posture, the left-hand side mirror 20, right-hand side mirror 22, and interior mirror 28 are shown. When applying geometric relationships and making certain approximations, the rear vision system master controller 40 can use an equation to calculate the desired RH mirror 22 horizontal angle ($\beta$) and desired interior mirror 28 horizontal angle ($\gamma$) using only the measured LH mirror 20 horizontal angle ($\alpha$) and distance data concerning the position of each of these mirrors 20,22,28. The LH mirror 20 horizontal angle ($\alpha$) is determined using received feedback position data from position sensors 42 (FIG. 6). It should be appreciated that this method uses relationships and data similar to the Blindzone setting method previously described.

Using one equation, the longitudinal distance (S) from the driver's eye (E) position in normal driving posture to a centerpoint of the mirrors 20 and 22 is calculated as follows:

$$S = (r_{LH} - r_L)/\tan 2\alpha$$

wherein $r_{LH}$ is a lateral distance from the driver's eye (E) of the normal driving posture to a centerpoint of the left-hand mirror 20, and $r_L$ is a lateral distance from the driver's eye position to a centerpoint of the left-hand mirror 20 when placing driver's head against the side window of the vehicle 12.

Using another equation, the desired RH mirror 22 horizontal angle (β) can be calculated using only the measured LH mirror 20 horizontal angle (α) and distance data concerning the position of each of these mirrors 20,22. The RH mirror 22 horizontal angle (β) is calculated as follows:

$$\beta = \tfrac{1}{2} \tan^{-1} [(r_{RH} - r_R)/S] + \beta_b$$

wherein $r_{RH}$ is a lateral distance from the driver's eye (E) position in a normal driving posture to a centerpoint of the right-hand side mirror 22, $r_R$ is a lateral distance from the driver's eye to a centerpoint of the interior mirror (R) when positioning the driver's head at the middle of the vehicle 12, the longitudinal distance (S) is from the driver's eye (E) to a centerpoint of the right-hand side mirror 22, and $\beta_b$ is a personal bias horizontal angle of the right-hand side mirror 22, which is the difference between the automatic angle and the overriding setting angle by the driver occupant 14.

Using another equation, the desired interior mirror 28 horizontal angle (γ) can be calculated using only the measured LH mirror horizontal angle (α) and distance data concerning the position of each of these mirrors 20,22. The interior mirror 28 horizontal angle (γ) is calculated as follows:

$$\gamma = \tfrac{1}{2} \tan^{-1} [r_R/(S+S_R)] + \gamma_b$$

wherein $r_R$ is a lateral distance from the driver's eye (E) position in a normal driving posture to a centerpoint of the interior mirror 28, the longitudinal distance (S) is from the driver's eye (E) to a centerpoint of the right-hand side mirror 22, the longitudinal distance ($S_R$) is from the centerpoint of the right-hand side mirror 22 to a centerpoint of the interior mirror 28, and $\gamma_b$ is a personal bias horizontal angle of the rearview mirror 28, which is the difference between the automatic angle and the overriding setting angle by the driver occupant 14.

As illustrated in FIG. 4B, the up-down positions for the synchronized rear vision system 10 are shown. The driver's eye (E) position in normal driving posture, the left-hand side mirror 20, right-hand side mirror 22, and interior mirror 28 are shown. The vertical distance (h) is the distance from the centerpoint of the side mirrors 20,22 to the interior mirror 28.

Using one equation, the vertical distance ($h_R$) from the driver's eye (E) position in a normal driving posture to a centerpoint of the interior mirror 28 is calculated as follows:

$$h_R = h - h_S$$

wherein a side vertical distance ($h_S$) is the distance from the driver's eye (E) to a centerpoint of the side mirrors 20,22.

Using another equation, the vertical distance ($h_S$) from the driver's eye (E) to a centerpoint of the side mirrors 20,22 is calculated as follows:

$$h_S = S \tan 2\theta$$

wherein S was calculated as previously described.

Using another equation, the desired interior mirror 28 vertical angle (φ) can be calculated. The interior mirror 28 vertical angle (φ) is calculated as follows:

$$\phi = \tfrac{1}{2} \tan^{-1} [h_R/(S+S_R)] + \phi_b$$

wherein S and $S_R$ were calculated as previously described and $\phi_b$ is a personal bias vertical angle of the interior mirror 28.

Figure 5:
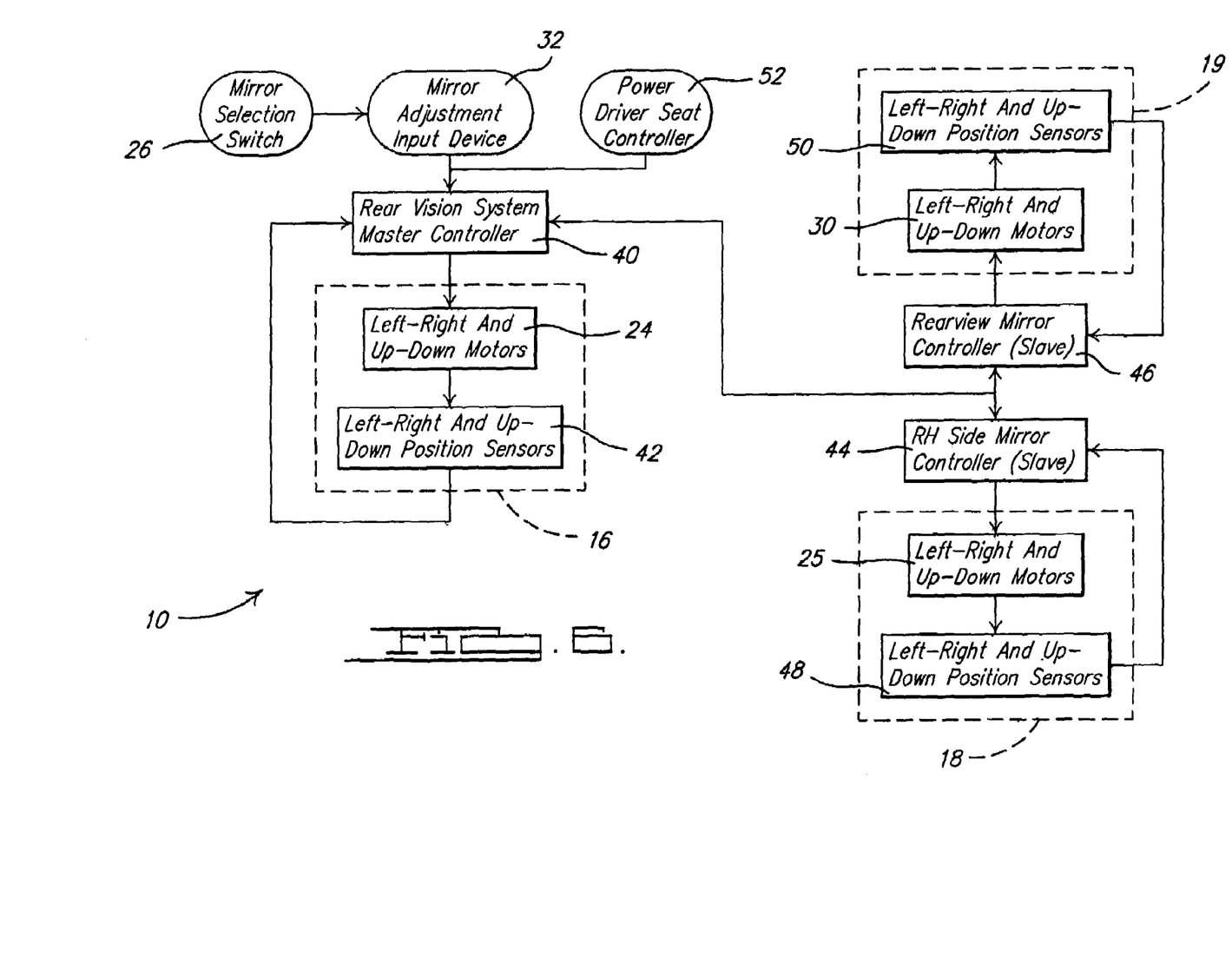
FIG. 5 is a diagrammatic view of a geometrical relationship of a seat position used in either the Blindzone or Blindzone/Glare Elimination setting method of the synchronized rear vision system of FIGS. 2A and 2B.
Figure 7:
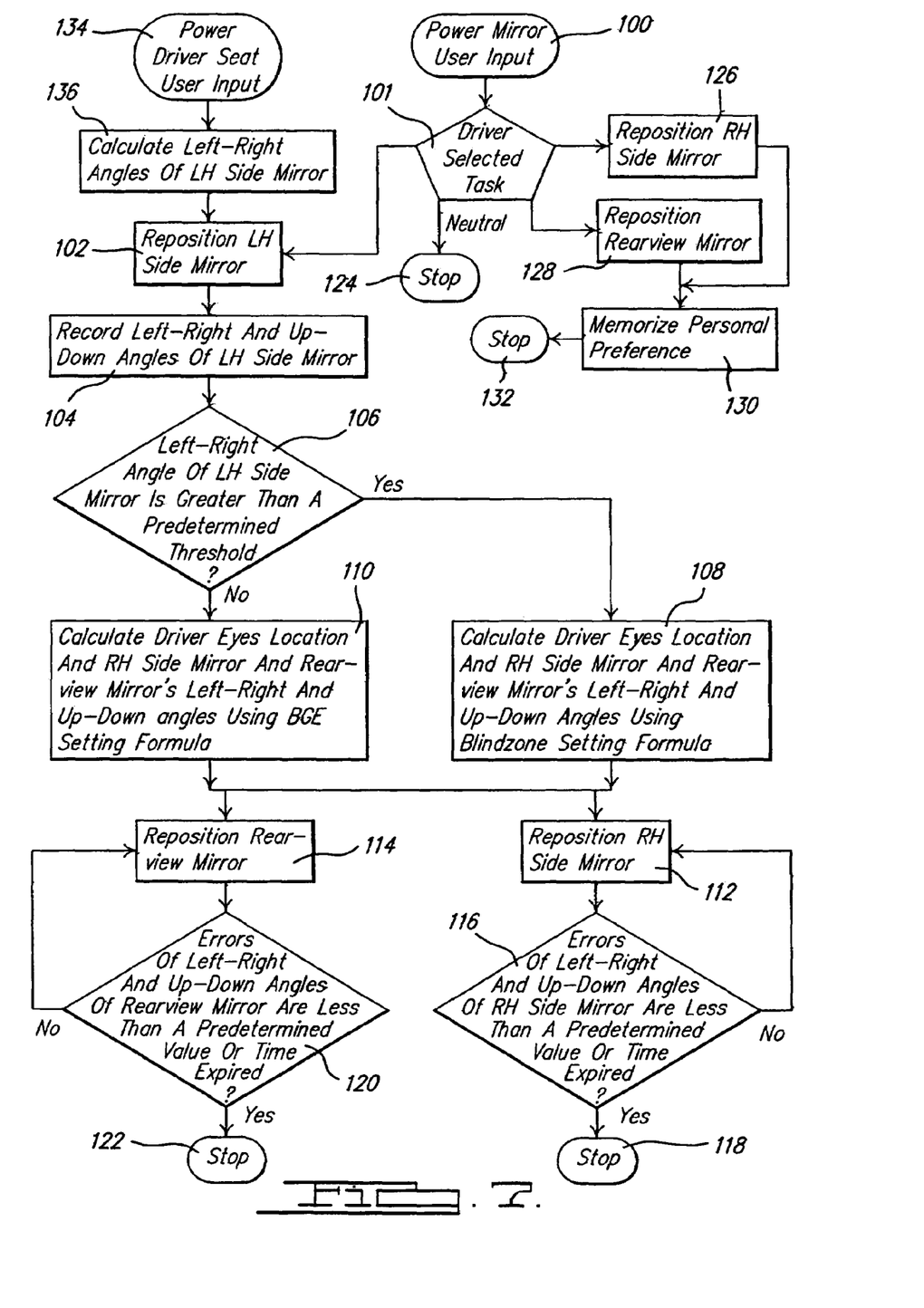
FIG. 7 is a flowchart of a method, according to the present invention, of operating the synchronized rear vision system of FIG. 6.

Referring to FIG. 5, the synchronized rear vision system 10 may include setting the position of the mirrors 20,22,28 based on the position of the driver seat 13. The geometrical relationship between the driver's eyes positions, the driver's seat position and the left-hand side mirror, the driver's eyes positions before (E') and after (E) seat adjustment, respectively, are illustrated. It should be appreciated that the dotted lines show the driver seat 13 in the original or before adjustment position and the solid lines show the driver seat 13 in the moved or after adjustment position.

The longitudinal distance, S, and the vertical distance, $h_S$, from the left-hand side mirror 20 to the driver's eyes positions, can be approximated using the following equations:

$$S = S' + (X - X') + (Z' + h'_s)(\sin\lambda - \sin\lambda')/\cos\lambda \quad (1)$$
$$\approx S' + (X - X') + (Z' + h'_s)(\lambda - \lambda')$$

and $$h_s = h'_s - (Z - Z') - (Z' + h'_s)(\cos\lambda' - \cos\lambda)/\cos\lambda' \quad (2)$$
$$\approx h'_s - (Z - Z') - (Z' + h'_s)(\lambda - \lambda')\tan\lambda'$$

The synchronized rear vision system 10 automatically adjusts the mirrors 20,22,28 when adjusting the driver seat 13. That is, the adjustment of the driver seat 13 will automatically result in the repositioning of all rearview mirrors 20,22,28 based on the geometrical relationship among the driver's eyes positions, and the positions of the driver's seat and all rearview mirrors. It should be appreciated that the equations previously described are used for the Blindzone setting and Blindzone/Glare Elimination setting methods.

Referring to FIG. 6, a block diagram of one embodiment of the synchronized rear vision system 10, according to the present invention, is shown. In the embodiment illustrated, the synchronized rear vision system 10 includes a mirror selection switch or position assembly 26, a mirror adjustment input device or lever 32, and a rear vision system master controller 40. The circuitry can be active at all times and signals from the mirror selection switch 26 are routed by the mirror adjustment input device 32 to the rear vision system master controller 40. The synchronized rear vision system 10 includes a left-hand (LH) outside or side rearview mirror assembly 16 having a left-right & up-down motors 24 and left-right & up-down position sensors 42. Signals from the rear vision system master controller 40 are routed to the motors 24 and the sensors 42 rout signals back to the controller 40. It should be appreciated that signals from the mirror selection switch 26 are routed to either the rear vision master controller 40, a RH side mirror controller 44, or an interior or rearview mirror controller 46. It should also be appreciated that, when the occupant driver 14 selects the LH/RH/I mode position 34 for mirror control, any mirror position input signals received from the mirror adjustment input device 32 are used by the rear vision system master controller 40 to control operation of the left-hand mirror's horizontal (left-right) and vertical (up-down) positioning motors 24. From the driver's perspective, this adjustment of the left-hand mirror 20 using the illustrated embodiment need not be any different than is done for conventional exterior rearview mirror systems. Furthermore, there are any of a number of well known circuit designs available for using the mirror position input signals to provide corresponding adjustments of the left hand mirror 20 using the motors 24.

The synchronized rear vision system 10 includes a right-hand (RH) side mirror controller 44 and a right-hand (RH) outside or side mirror assembly 18 having left-right & up-down motors 25 and left-right & up-down position sensors 48. Signals from the RH side mirror controller 44 are routed to the motors 25 and the sensors 48 route signals back to the controller 44. It should be appreciated that signals from the RH side mirror controller 44 are routed back to the rear vision system master controller 40. It should also be appreciated that the RH side mirror controller 44 is a slave to the rear vision system master controller 40.

The synchronized rear vision system 10 includes a rearview mirror controller 46 and the interior rearview mirror assembly 19 having left-right & up-down motors 30 and left-right & up-down position sensors 50. Signals from the rearview mirror controller 46 are routed to the motors 30 and the sensors 50 route signals back to the controller 46. It should be appreciated that signals from the rearview mirror controller 46 are routed back to the rear vision system master controller 40. It should also be appreciated that the rearview mirror controller 46 is a slave to the rear vision system master controller 40.

Optionally, the synchronized rear vision system 10 may include a power driver seat controller 52. Signals from the power driver seat controller 52 are routed to the rear vision system master controller 40. As a result, adjustment of the driver seat 13 will automatically result in the repositioning of all rearview mirrors. It should be appreciated that, in the embodiment illustrated, the power driver seat controller 52 allows for a synchronized driver seat and rear vision system.

In operation, the instantaneous position of the LH mirror 20 is detected using position sensors 42 and is provided as a feedback position data to the rear vision system master controller 40. Using this data, the rear vision system master controller 40 calculates the necessary position output signals for the RH side mirror 22 and the interior rearview mirror 28. This output signal is sent to the RH side mirror controller 44, which then utilizes its associated motors 25 to properly position the RH side mirror 22, and to the rearview mirror controller 46, which then utilizes its associated motors 30 to properly position the interior rearview mirror 28. The position sensors 48 of the RH mirror assembly 18 instantaneously monitor the angular positioning of mirror 22 and provide feedback used by the RH side mirror controller 44 to determine when the mirror 22 is properly positioned. The position sensors 50 of the interior rearview mirror assembly 19 instantaneously monitor the angular positioning of the interior rearview mirror 28 and provide feedback used by the rearview mirror controller 46 to determine when the rearview mirror 28 is properly positioned. It should be appreciated that these position sensors 42, 48, 50 and their use for feedback in positioning the mirrors 20,22,28 can be implemented using known circuit designs employed in memory mirror systems of the type in which a desired position of the mirror for a particular driver is stored in memory and can be recalled to automatically reposition the mirror to that driver's preferred position. It should also be appreciated that memory mirror systems of this type can also be integrated with other cockpit devices such as electronic seat positioning and adjustable pedal systems. In this regard, the rear vision system master controller 40 can be a separate circuit from the RH mirror controller 44 and the rearview mirror controller 46 or can be integrated in with any or all of these, its function in this embodiment primarily being to utilize the LH mirror feedback position data from the position sensors 42 to determine the automatic adjustments needed to the RH side mirror 22 and the interior rearview mirror 28 to position them in the desired orientation.

Figure 8:
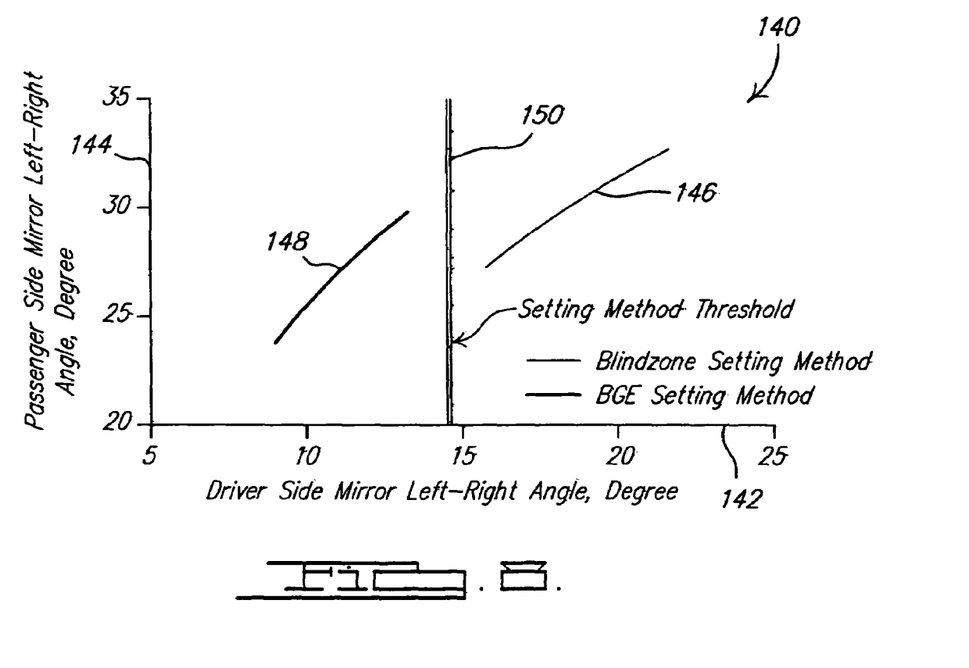
FIG. 8 is a graph of a setting method threshold for a first example vehicle using the Blindzone setting method and Blindzone/Glare Elimination setting method for the method of FIG. 7.

Referring to FIG. 8, a method, according to the present invention, of operating the synchronized rear vision system 10 is shown. In the embodiment illustrated, the method is a control algorithm for the synchronized rear vision system 10. The method may start in block 100 with power mirror user input. The mirror selection switch 26 and mirror adjustment input device 32 are used to provide power mirror user input to the rear vision system master controller 40. The method then advances to block 101 and determines the driver task selected. The rear vision system master controller 40 receives signals from the mirror selection switch 26 and mirror adjustment input device 32 to determine the driver task selected. If the driver task selected is the LH side mirror 20, the method advances to block 102 and repositions the LH side mirror 20. The rear vision system master controller 40 sends signals to the motors 24 to position the mirror 20 and receives feedback signals from the position sensors 40 to accurately position the mirror 20. The method advances to block 104 and records the left-right & up-down angles of the LH side mirror 20 based on signals from the position sensors 40.

Figure 9:
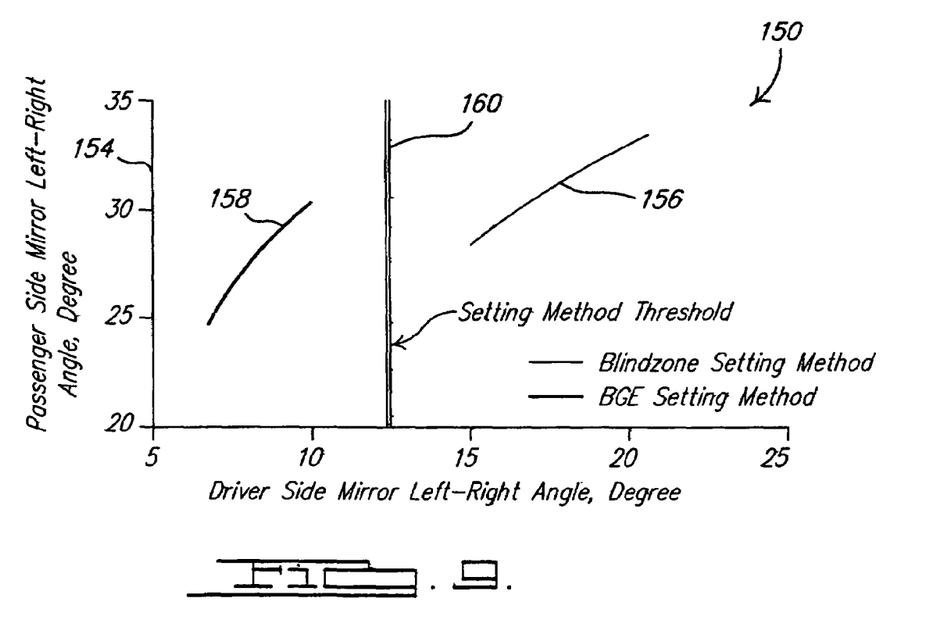
FIG. 9 is a graph of a setting method threshold for a second example vehicle using the Blindzone setting method and Blindzone/Glare Elmination setting method for the method of FIG. 7.

After block 104, the method advances to block 106 and determines whether the left-right angle of the LH side mirror 20 is greater than a predetermined setting method threshold (FIGS. 8 and 9). The rear vision system master controller 40 performs this calculation based on these angles and a predetermined setting method threshold stored in memory. If so, the method advances to block 108 and calculates the driver eyes location (E) and the left-right and up-down angles of the RH side mirror 22 and the rearview mirror 28 using the blindzone setting formula previously described. The rear vision system master controller 40 performs this calculation based on these angles of the LH mirror 20 and the equations for the Blindzone setting method stored in memory. If not, the method advances to block 110 and calculates the driver eyes location and the left-right and up-down angles of the RH side mirror 22 and rearview mirror 28 using the Blindzone/Glare Elimination setting formula previously described. The rear vision system master controller 40 performs this calculation based on these angles of the LH mirror 20 and the equations for the blindzone/glare elimination setting method stored in memory. It should be appreciated that block 106 detects the setting method used by the driver 13.

After either one of blocks 108 and 110, the method advances to both blocks 112 and 114. In block 112, the method repositions the RH side mirror 22. The rear vision system master controller 40 sends signal a signal to the RH side mirror controller 44, which, in turn, sends signals to the motors 25 to position the mirror 22 and receives feedback signals from the position sensors 48 to accurately position the mirror 22. The method advances to block 116 and determines whether errors of left-right and up-down angles of RH side mirror 22 are less than a predetermined value or time expired. The RH side mirror controller 44 performs this calculation based on these angles and a predetermined value stored in memory or a timer therein. If not, the method advances to block 112 previously described. If so, the method advances to block 118 and stops.

In block 114, the method repositions the interior rearview mirror 28. The rear vision system master controller 40 sends signal a signal to the rearview mirror controller 46, which, in turn, sends signals to the motors 30 to position the mirror 28 and receives feedback signals from the position sensors 50 to accurately position the mirror 28. The method advances to block 120 and determines whether errors of left-right and up-down angles of the interior rearview mirror 28 are less than a predetermined value or time. expired. The rearview mirror controller 46 performs this calculation based on these angles and a predetermined value stored in memory or a timer therein. If not, the method advances to block 114 previously described. If so, the method advances to block 122 and stops.

Returning to block 101, if the driver task selected is neutral, the method advances to block 124 and stops. The rear vision system master controller 40 receives signals from the mirror selection switch 26 and mirror adjustment input device 32 to determine that no or a neutral driver task is selected. In block 101, if the driver task selected is the RH side mirror 22, the method advances to block 126 and repositions the RH side mirror 22. The rear vision system master controller 40 receives signals from the mirror selection switch 26 and mirror adjustment input device 32 to determine that the driver task selected is the RH side mirror 22 and sends a signal to the RH side mirror controller 44, which, in turn, sends signals to the motors 25 to position the mirror 22. In block 101, if the driver task selected is the rearview mirror 28, the method advances to block 128 and repositions the rearview mirror 28. The rear vision system master controller 40 receives signals from the mirror selection switch 26 and mirror adjustment input device 32 to determine that the driver task selected is the rearview mirror 28 and sends a signal to the rearview mirror controller 46, which, in turn, sends signals to the motors 30 to position the mirror 28. After either one of blocks 126 and 128, the method may advance to block 130 and memorizes the personal preference. The rear vision system master controller 40 stores the difference between the automatic angles and the overriding setting angles. The method then advances to block 132 and stops. It should be appreciated that the default value for all the biases is null. It should also be appreciated that, when a driver chooses to override the automatic setting of the RH side mirror 22 and/or interior rearview mirror 28, the difference between the automatic and overriding setting angles will then be memorized as the personal biases. It should further be appreciated that these biases will be added to the calculated setting values. It should still further be appreciated that block 130 is optional.

Optionally, the method may start in block 134 with a power driver seat user input. The rear vision system master controller 40 receives signals from the power driver seat controller 52 as to the adjusted position of the driver seat 13. The method then advances to block 136 and calculates left-right angles of the LH side mirror 20. The rear vision system master controller 40 calculates these angles based on signals from the position sensors 40 according to the setting methods previously described. The method then advances to block 102 previously described.

Referring to FIG. 8, a graph of a setting method threshold is shown for a first example vehicle. The graph 140 has an x-axis 142 for driver side mirror left-right angle in degrees and a y-axis 144 for passenger side mirror left-right angle in degrees. The graph 140 has a first plot 146 for the Blindzone setting method and a second plot 148 for the Blindzone/Glare Elimination setting method. The graph 140 further has a vertical dividing line 150 representing a setting method threshold. As illustrated, the setting method threshold is approximately fifteen degrees (15°) and the first plot 146 is to the right of the vertical dividing line 150 and the second plot 148 is to the left of the vertical dividing line 150. As such, the Blindzone setting method is greater than the setting method threshold and the Blindzone/Glare Elimination setting method is less than the setting method threshold for the driver side mirror left-right angle. In addition, the Blindzone setting method is mostly greater than the Blindzone/Glare Elimination setting method for the passenger side mirror left-right angle. It should be appreciated that the graph 140 illustrates how to detect the setting method used by the driver 13.

Referring to FIG. 9, a graph of a setting method threshold is shown for a second example vehicle. The graph 150 has an x-axis 152 for driver side mirror left-right angle in degrees and a y-axis 154 for passenger side mirror left-right angle in degrees. The graph 150 has a first plot 156 for the Blindzone setting method and a second plot 158 for the Blindzone/Glare Elimination setting method. The graph 150 further has a vertical dividing line 160 representing a setting method threshold. As illustrated, the setting method threshold is approximately twelve degrees (12°) and the first plot 156 is to the right of the vertical dividing line 160 and the second plot 158 is to the left of the vertical dividing line 160. As such, the Blindzone setting method is greater than the setting method threshold and the Blindzone/Glare Elimination setting method is less than the setting method threshold for the driver side mirror left-right angle. In addition, the Blindzone setting method is mostly greater than the Blindzone/Glare Elimination setting method for the passenger side mirror left-right angle. It should be appreciated that the graph 150 illustrates how to detect the setting method used by the driver 13.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A synchronized rear vision system for a vehicle comprising:
 a pair of external side rearview mirrors for attachment to the vehicle;
 an interior rearview mirror for attachment to the vehicle; and
 a system master controller for:
  detecting an instantaneous position of one of said pair of external side rearview mirrors;
  determining an external side rearview mirror setting method based upon said instantaneous position and a predetermined setting method threshold;
  calculating a first driver's eye position and a position output signal for at least another one of said pair of external side rearview mirrors and said interior rearview mirror based upon said external side rearview mirror setting method determined; and
  automatically positioning at least the another one of said pair of external side rearview external mirrors and said interior rearview mirror based on said detected external side rearview mirror setting method and said first driver's eye position.

2. The synchronized rear vision system as set forth in claim 1, wherein said pair of external side rearview mirrors comprise a left-hand side rearview mirror and a right-hand side rearview mirror.

3. The synchronized rear vision system as set forth in claim 2 including a right-hand side rearview mirror controller receiving the output signals from said system master controller and communicating with said right-hand side rearview mirror to position said right-hand side rearview mirror.

4. The synchronized rear vision system as set forth in claim 3, wherein said right-hand side rearview mirror includes a left-right motor and an up-down motor electrically connected to said right-hand side mirror controller.

5. The synchronized rear vision system as set forth in claim 3, wherein said right-hand side rearview mirror includes a left-right position sensor and an up-down position sensor electrically connected to said right-hand side mirror controller.

6. The synchronized rear vision system as set forth in claim 2, wherein said left-hand side rearview mirror includes a left-right motor and an up-down motor electrically connected to said system master controller.

7. The synchronized rear vision system as set forth in claim 2, wherein said left-hand side rearview mirror includes a left-right position sensor and an up-down position sensor electrically connected to said system master controller.

8. The synchronized rear vision system as set forth in claim 1 including an interior rearview mirror controller receiving the output signals from said system master controller and communicating with said interior rearview mirror to position said interior rearview mirror.

9. The synchronized rear vision system as set forth in claim 8, wherein said interior rearview mirror includes a left-right motor and an up-down motor electrically connected to said interior mirror controller.

10. The synchronized rear vision system as set forth in claim 8, wherein said interior rearview mirror includes a left-right position sensor and an up-down position sensor electrically connected to said interior mirror controller.

11. The synchronized rear vision system as set forth in claim 1 including a mirror selection switch for selecting at least one of said exterior side rearview mirrors and said interior rearview mirror to be adjusted.

12. The synchronized rear vision system as set forth in claim 11 including a mirror adjustment input device communicating with said mirror selection switch and said system master controller to adjust a position of at least one of said exterior side rearview mirrors and said interior rearview mirror selected by said mirror selection switch.

13. The synchronized rear vision system as set forth in claim 1 including a power driver seat controller communicating with a mirror adjustment input device and communicating with said system master controller to readjust a position of at least one of said external side rearview mirrors and said interior rearview mirror based on a position of a driver seat of the vehicle, wherein said mirror readjustment is based on a second driver's eye position in accordance with the following formulas:

$$S=S'+(X-X')+(Z'+h_s')(\sin \lambda - \sin \lambda')/\cos \lambda; \text{ and}$$

$$h_s = h_s' - (Z-Z') - (Z'+h_s')(\cos\_\lambda' - \cos\_{-\lambda})/\cos\_-',$$

wherein:
S is a longitudinal distance from a driver's eye to a centerpoint of at least one of said external side rearview mirrors;
$h_s$ is a side vertical distance from said driver's eye to said centerpoint of at least one of said external side rearview mirrors;
X is a first fore/aft position of said driver seat;
X' is a second fore/aft position of said driver seat;
Z is a first up/down position of said driver seat;
Z' is a second up/down position of said driver seat;
λ is a first angular position of said driver seat;
λ' is a second angular position of said driver seat; and
S' and $h_s'$ are the first driver's eye position.

14. The synchronized rear vision system as set forth in claim 1, wherein said external side rearview mirror setting method detected is one of a Blindzone Setting Method and a Blindzone/Glare Elimination Setting Method.

15. The synchronized rear vision system as set forth in claim 14, wherein said first driver's eye position is represented by the longitudinal distance, S, from said driver's eye to a centerpoint of said one of said pair of external side rearview mirrors and is determined in accordance with one of the following formulas:
if said Blindzone Setting Method is detected, then $$S=r_{LH}/\tan 2\alpha,$$

wherein $r_{LH}$ is a lateral distance associated with said one of said pair of external side rearview mirrors; and α is a horizontal angle associated with said one of said pair of external side rearview mirrors, and
if said Blindzone/Glare Elimination Setting Method is detected, then $$S=(r_{LH}-r_L)/\tan 2\alpha,$$

wherein α is a horizontal angle associated with said one of said pair of external side rearview mirrors; $r_{LH}$ is a lateral distance from a driver's eye position in a normal driving posture to a centerpoint of one of said pair of external side rearview mirrors; and $r_L$ is a lateral distance from the driver's eye position in the normal driving posture to a centerpoint of said one of said pair of external side rearview mirrors when a driver's head is placed against a side window of the vehicle.

16. The synchronized rear vision system as set forth in claim 1, including a power driver seat controller communicating with a mirror adjustment input device and communicating with said system master controller to readjust a position of at least one of said external side rearview mirrors and said interior rearview mirror based upon a position of a driver seat of the vehicle, wherein said mirror readjustment is based on a second driver's eye position in accordance with the following formulas:

$$S \approx S' + (X-X') + (Z'+h_s')(\lambda - \lambda'); \text{ and}$$

$$h_s \approx h_s' - (Z-Z') - (Z'+h_s')(\lambda - \lambda')\tan\_{-\lambda'};$$

wherein:
S is a longitudinal distance from a driver's eye to a centerpoint of at least one of said external side rearview mirrors;
$h_s$ is a side vertical distance from said driver's eye to said centerpoint of at least one of said external side rearview mirrors;
X is a first fore/aft position of said driver seat;
X' is a second fore/aft position of said driver seat;
Z is a first up/down position of said driver seat;
Z' is a second up/down position of said driver seat;
λ is a first angular position of said driver seat;
λ' is a second angular position of said driver seat; and
S' and $h_s'$ are the first driver's eye position.

17. The synchronized rear vision system as set forth in claim 1, wherein said system master controller automatically positions at least one of said another one of said side rearview mirrors and said interior rearview mirror when only said instantaneous position of said one of said side rearview mirrors is changed.

18. The synchronized rear vision system set forth in claim 17, wherein said position output signal associated with said another one of said pair of external side rearview mirrors is calculated based upon one of the following formulas:
if the Blindzone Setting Method is detected, then $$\beta = \tfrac{1}{2}\tan^{-1}(r_{RH}/S) + \beta_b,$$

wherein β is a horizontal angle associated with said another one of said pair of external side rearview mirrors; $r_{RH}$ is a lateral distance associated with said another one of said pair of external side rearview mirrors; and $\beta_b$ is a personal bias angle associated with said another one of said pair if external side rearview mirrors; and
if the Blindzone/Glare Elimination Setting Method is detected, then $$\beta = \tfrac{1}{2}\tan^{-}[(r_{RH}-r_R)/S] + \beta_b,$$

wherein $r_{RH}$ is a lateral distance from said first driver's eye position in a normal driving posture to a centerpoint of one of the pair of external side rearview mirrors, $r_R$ is a lateral distance from said first driver's eye position to a centerpoint of said interior mirror when a driver's head is placed at a middle of the vehicle; S is a lateral distance from the first driver's eye position to a centerpoint of one of the pair of external side rearview mirrors; and $\beta_b$ is a personal bias horizontal angle of said one of the pair of external side rearview mirrors.

19. The synchronized rear vision system set forth in claim 18, wherein the personal bias horizontal angle is the difference between an automatic angle and an overriding setting angle set by the driver.

20. The synchronized rear vision system set forth in claim 17, wherein said position output signal associated with said interior rearview mirror is calculated based upon the following formula:

$$\gamma = \tfrac{1}{2}\tan^{-1}(r_R/S+S_R)+\gamma_b$$

wherein $\gamma$ is a horizontal angle associated with said interior rearview mirror; $r_R$ is a lateral distance associated with said interior rearview mirror; $S_R$ is a lateral distance associated with said interior rearview mirror; and $\gamma_b$ is a personal bias angle associated with said interior rearview mirror.

21. A synchronized rear vision system for a vehicle comprising:
an adjustable driver seat;
a pair of external side rearview mirrors for attachment to the vehicle;
an interior rearview mirror for attachment to the vehicle;
a power driver seat controller communicating with said driver seat; and
a system master controller for:
detecting an instantaneous position of one of said pair of external side rearview mirrors;
determining an external side rearview mirror setting method based upon said instantaneous position and a predetermined setting method threshold;
calculating a first driver's eye position and position output signals for at least another one of said pair of external side rearview mirrors and said interior rearview mirror; and
automatically positioning at least the another one of said pair of external side rearview mirrors and said interior rearview mirror based on the instantaneous position and to readjust a position of at least one of said pair of external side rearview mirrors and said interior rearview mirror based on said detected external side rearview mirror setting method and a position of said driver seat of the vehicle.

22. The synchronized rear vision system as set forth in claim 21, wherein said external side rearview mirror setting method detected is one of a Blindzone Setting Method and a Blindzone/Glare Elimination Setting Method.

23. The synchronized rear vision system as set forth in claim 22, wherein said first driver's eye position is represented by S and is determined in accordance with one of the following formulas:
if a Blindzone Setting Method is detected, then $$S = r_{LH}/\tan 2\alpha,$$

wherein $r_{LH}$ is a lateral distance associated with said one of said pair of external side rearview mirrors; and $\alpha$ is a horizontal angle associated with said one of said pair of external side rearview mirrors, or
if a Blindzone/Glare Elimination Setting Method is detected, then $$S = (r_{LH} - r_L)/\tan 2\alpha,$$

wherein $\alpha$ is a horizontal angle associated with said one of said pair of external side rearview mirrors; $r_{LH}$ is a lateral distance from a driver's eye position in a normal driving posture to a centerpoint of one of said pair of external side rearview mirrors; and $r_L$ is a lateral distance from the driver's eye position in the normal driving posture to a centerpoint of said one of said pair of external side rearview mirrors when a driver's head is placed against a side window of the vehicle.

24. A method of operating a rear vision system for a vehicle, said method comprising the steps of:
receiving a power mirror user input;
determining a driver task selected based on the power mirror user input;
repositioning a left-hand side rearview mirror if the driver task selected is a left-hand side rearview mirror;
recording a left-right angle and up-down angle of the left-hand side rearview mirror;
determining whether the left-right angle of the left-hand side rearview mirror is greater than a predetermined threshold;
calculating a driver eyes location and left-right angle and up-down angle of a right-hand side rearview mirror and an interior rearview mirror using a Blindzone/Glare Elimination setting formula if the left-right angle of the left-hand side rearview mirror is not greater than a predetermined threshold;
calculating a driver eyes location and left-right angle and up-down angle of a right-hand side mirror and an interior rearview mirror using a Blindzone setting formula if the left-right angle of the left-hand side rearview mirror is greater than a predetermined threshold;
repositioning the interior rearview mirror;
repositioning the right-hand side rearview mirror;
determining whether errors of the left-right angle and the up-down angle of the interior rearview mirror are less than a predetermined value or time expired;
determining whether errors of the left-right angle and the up-down angle of the right-hand side rearview mirror are less than a predetermined value or time expired;
repositioning the interior rearview mirror if the errors of the left-right angle and the up-down angle of the interior rearview mirror are not less than a predetermined value or time expired; and
repositioning the right-hand side rearview mirror if the errors of the left-right angle and the up-down angle of the interior rearview mirror are not less than a predetermined value or time expired.

25. The method as set forth in claim 24 including the step of repositioning the right-hand side rearview mirror if the driver task selected is the right-hand side rearview mirror.

26. The method as set forth in claim 24 including the step of repositioning the interior rearview mirror if the driver task selected is the interior rearview mirror.

27. The method as set forth in claim 25 including the step of memorizing a personal bias of the repositioned right-hand side rearview mirror.

28. The method as set forth in claim 26 including the step of memorizing a personal bias of the repositioned interior rearview mirror.

29. The method as set forth in claim 24 including the step of receiving a power driver seat user input.

30. The method as set forth in claim 29 including the step of calculating the left-right angle of the left-hand side rearview mirror prior to said step of repositioning the left-hand side rearview mirror.

* * * * *